Feb. 20, 1923.

C. H. WEBER.
STEERING MECHANISM FOR PORTABLE TRUCKS.
FILED MAR. 21, 1921.

1,446,140.

Inventor
Charles H. Weber

By C. C. Shepherd.
Attorney

Patented Feb. 20, 1923.

1,446,140

UNITED STATES PATENT OFFICE.

CHARLES H. WEBER, OF COLUMBUS, OHIO.

STEERING MECHANISM FOR PORTABLE TRUCKS.

Application filed March 21, 1921. Serial No. 454,108.

*To all whom it may concern:*

Be it known that CHARLES H. WEBER, a citizen of the United States, residing at Columbus, in the county of Franklin and State of Ohio, has invented certain new and useful Improvements in Steering Mechanism for Portable Trucks, of which the following is a specification.

This invention relates to improvements in trucks of the type utilized by railway workmen for the purpose of transporting baggage or other commodities, the primary object of the invention being to provide a truck which will be capable of having its movements readily controlled by means of improved steering mechanism, which is capable of being actuated by the operator of the truck while the latter is engaged in pushing the same through the agency of a rearwardly located tongue or handle structure.

Another object of the invention resides in a truck wherein is provided a set of rearwardly located supporting wheels and a co-operative set of forwardly located steering wheels, the latter being capable of revolving by means of a fifth wheel construction, and in the provision of improved means for controlling the positions of the steering wheels, said means consisting of a drum rotatably mounted upon the axle of the rearwardly located supporting wheels, said axle including a rearwardly extending pivoted handle structure by means of which the truck may be manually propelled, the grasping bar of the handle structure being rotatably mounted and having a sprocket rotatably connected therewith around which an endless chain is trained, the said chain passing over a similar sprocket provided upon the axle drum, and from said drum reversely wound cables extend to the forwardly located steering axle, the construction being such that while the operator is engaged in propelling said truck, he may at the same time rotate the handle bar and thus through the means of the chain and sprocket construction effect the rotation of said drum, thereby winding or unwinding the steering cables about the drum so as to control the positions of the steering wheels, the construction admitting of the convenient steering of the truck while the operator is engaged in propelling or pushing the same.

A further object of the invention resides in providing the rearwardly located supporting wheels with fixed ratchet wheels, the latter being arranged for cooperation with spring pressed pivoted pawls carried by the pivoted handle structure, the arrangement being such that when the handle structure is oscillated in a given direction, the pawls will engage with the ratchet wheels to effect their rotation and consequently the rotation of the supporting wheels, thus imparting an initial movement to the truck which is of considerable advantage in the starting of heavily laden vehicles.

With these and other objects in view, as will appear as the description proceeds, the invention accordingly consists in the novel features of construction, combinations of elements and arrangements of parts, hereinafter to be fully described and to have the scope thereof pointed out in the appended claims.

In the accompanying drawing, forming a part of this specification, and in which similar characters of reference denote like and corresponding parts throughout the several views thereof:

Figure 1:
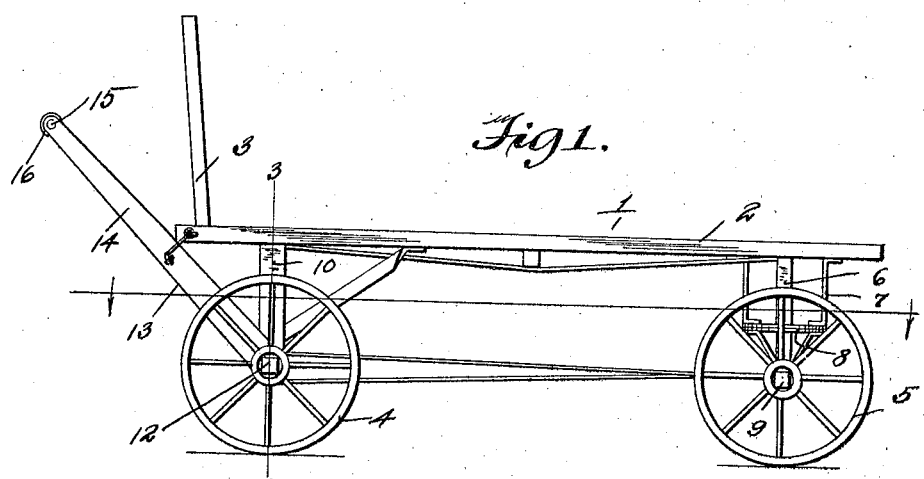
Figure 1 is a side elevation of the improved baggage truck comprising the present invention.
Figure 2:
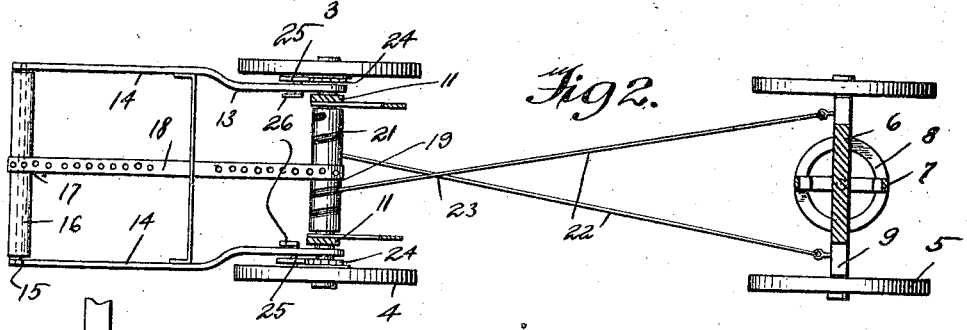
Figure 2 is a plan view of the running gear of the truck and disclosing the application of the steering mechanism comprising the present invention thereto.
Figure 3:
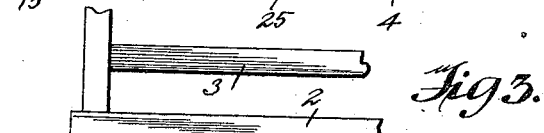
Figure 3 is an enlarged partial sectional view taken along the plane indicated by the line 3—3 of Figure 1.
Figure 4:
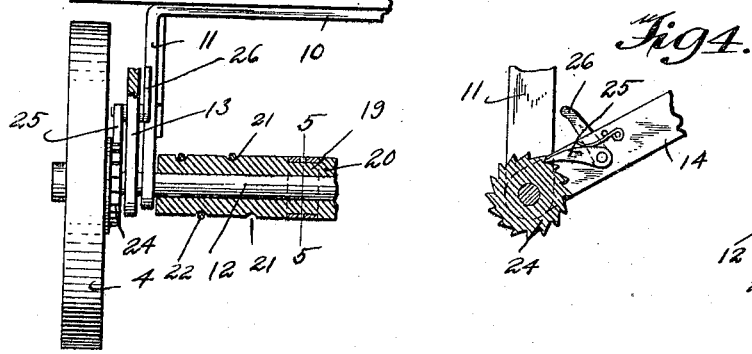
Figure 4 is a detail sectional view disclosing more particularly the pawl and ratchet mechanism.
Figure 5:
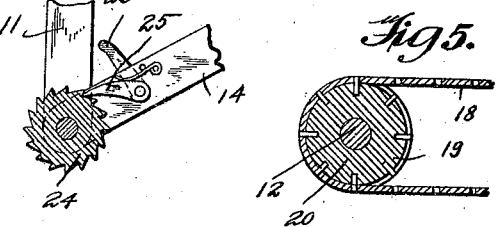
Figure 5 is a sectional view taken along the line 5—5 of Figure 3.

Referring more particularly to the details of the invention, the numeral 1 designates generally a baggage truck or other similar vehicle in which the present invention may find expression, a baggage truck however, being selected because of the clearness with which the present invention may be explained in connection therewith. As usual, the truck 1 includes a horizontally arranged platform 2, capable of receiving various kinds of freight or baggage, the said platform being capable of carrying a vehicle frame 3 for holding commodities in proper position upon the platform. For portably supporting the platform, there is provided rearwardly located supporting wheels 4 and forwardly located steering wheels 5. The wheels 5 are connected with the under side of the platform by means of a transversely extending bolster 6. A bracket construction 7 depends from the platform 2, the said bracket construction carrying at its lower end a fifth wheel structure 8, which in turn is connected to an intermediate point of the forwardly located steering axle 9 of the truck, the said axle being adapted to carry the wheels 5 at its outer ends in the usual manner. The rear wheels 4 are connected with the truck by means of a substantially U shaped bracket 10, which includes spaced vertical legs 11, the latter being adapted to receive at the lower ends thereof an axle 12 upon the ends of which the supporting wheels 4 may be rotatably mounted. This construction is common to baggage trucks generally, therefore, a further explanation relative thereto will be accordingly omitted.

In order to provide a convenient structure for effecting the manual propulsion of the truck, and also to govern the steering of the same, the present invention employs a pivotally mounted handle structure 13. This structure includes a pair of spaced parallel bars 14, which have the lower ends thereof pivotally connected with the axle 12, while the rear or upper ends of the handle structure are united by a transversely extending rod 15. Rotatably journaled upon the rod 15 and extending transversely of the bars 14 is a rotatable sleeve 16 by means of which the handle structure may be manually grasped when movement is to be imparted to the truck. In this instance, the sleeve 16 is formed to include a centrally located sprocket 17 around which is trained an endless chain or belt 18, the latter being formed with apertures capable of meshing with the teeth of the sprocket 17. The chain or belt 18 is also passed around a similar sprocket 19 which is carried by a cable drum 20, the latter being, in turn, rotatably mounted upon the axle 12. It will be apparent that by this construction the rotation of the sleeve 16 will result in rotating the sprocket 17, and hence by means of the chain or belt 18 corresponding rotation will be imparted to the drum 20.

The drum 20 is provided on opposite sides of the sprocket 19 with reversely wound spiral grooves 21, in which are seated and secured the rearward ends of cables 22. These cables are crossed as at 23 and have their forward ends connected with the front axle 9 at positions on opposite sides of the fifth wheel construction 8. It will therefore be manifest that when the operator desires to change the course of the truck it will simply be necessary to rotate the sleeve 16. This will result in rotating the drum 20 so that the cables 23 may be wound about or released from said drum so as to revolve the front axle 9 about the fifth wheel structure. This construction, therefore, results in enabling the operator to readily push the vehicle and at the same time to obtain convenient control of the steering mechanism of said vehicle.

In trucks of this nature it is desirable that means be provided whereby an initial starting movement may be given the truck so as to overcome the inertia thereof, in order that subsequent manual pushing of the truck may be facilitated. This is accomplished in the present invention by providing the supporting wheels 4 with fixed ratchet wheels 24 upon their inner sides, the said wheels 24 being rotatable about the axle 12. The bars 14 of the handle structure are provided contiguous to their lower ends with pivoted pawls 25, which are spring pressed so that the ends thereof will engage with the teeth of the ratchet wheels. It will therefore be manifest that by lowering the handle structure and then by subsequently elevating the same, the pawls will engage with the teeth of the ratchets so as to revolve the wheels 4, thus enabling an initial starting movement to be imparted to the truck and to thereby facilitate its starting. The pawls 25 have rigidly connected therewith crank arms 26, which are so disposed that when the handle structure is in its elevated position, the outer ends of said arms will engage with the legs 11 of the bracket 10 so as to hold the pawls out of engagement with the teeth of the ratchets 24. This construction will enable the direction of travel of the truck to be readily reversed without encountering opposition on the part of the ratchet construction, and also the pawls 25 will be maintained out of engagement with the ratchet wheels during the normal movement of the truck in any direction, so as to overcome resistance and to eliminate undue noise.

In view of the foregoing description, it will be apparent that the present invention provides a truck of considerable utility in its particular field of use. The construction may be readily applied to the running gear of trucks of standard construction and will be of very material assistance in facilitating the control and operation of such trucks. It will be understood, however, that the invention is not limited to use in connection with baggage trucks per se, but is applicable to other portable vehicles.

What is claimed is:

1. In a baggage truck, a running gear including a rear supporting axle and a steering axle, a handle structure pivotally connected with the supporting axle, the sleeve rotatably carried by the handle structure, a drum loosely mounted on the supporting axle, means operable by the sleeve for rotating the drum, and steering cables wound upon the drum and connecting the steering axle for controlling the course of the same when the drum is rotated.

2. In a baggage truck, a running gear including a rear supporting axle and a forward steering axle, a handle structure pivotally connected with the supporting axle and having a rotatable sleeve carried thereby, a drum rotatably mounted on the supporting axle, an endless belt connecting the sleeve and drum and operable to rotate the drum when the sleeve is rotated, crossed cables having their rear ends secured to the drum and their forward ends connected with the steering axle, as and for the purpose set forth.

3. In a baggage truck, a running gear including a rear supporting axle and a steering axle, wheels loosely carried by the respective axles, a handle structure pivotally connected with the supporting axle, ratchet wheels fixed to the wheels of the supporting axle, pawls pivotally carried by the handle structure for engagement with the ratchet wheels to effect the rotation thereof upon upward movement on the part of the handle structure, a drum loosely mounted on the supporting axle, cables connecting the drum and steering axle, and means carried by the handle structure for rotating the drum, as and for the purpose set forth.

4. In a baggage truck, a running gear including a rear supporting axle and a front steering axle, wheels for both axles, a handle structure pivotally connected with the rear axle, means for rotating the wheels of the supporting axle when the handle structure is moved upwardly, means connecting the steering axle and rear supporting axle for controlling the course of the wheels of the steering axle, and means carried by the handle structure for operating the connecting means between the axles during the movement of the handle structure.

In testimony whereof I affix my signature.

CHARLES H. WEBER.